US008518535B2

(12) United States Patent
Fukuda et al.

(10) Patent No.: US 8,518,535 B2
(45) Date of Patent: Aug. 27, 2013

(54) MULTILAYER INSULATED WIRE AND TRANSFORMER USING THE SAME

(75) Inventors: Hideo Fukuda, Chiyoda-ku (JP); Makoto Onodera, Chiyoda-ku (JP); Dai Fujiwara, Chiyoda-ku (JP); Minoru Saito, Chiyoda-ku (JP); Tsuneo Aoi, Chiyoda-ku (JP); Isamu Kobayashi, Chiyoda-ku (JP); Junichi Ishizuka, Chiyoda-ku (JP); Noriyoshi Fushimi, Chiyoda-ku (JP)

(73) Assignee: The Furukawa Electric., Ltd., Tokyo (JP)

( * ) Notice: Subject to any disclaimer, the term of this patent is extended or adjusted under 35 U.S.C. 154(b) by 125 days.

(21) Appl. No.: 12/078,122

(22) Filed: Mar. 27, 2008

(65) Prior Publication Data

US 2008/0187759 A1 Aug. 7, 2008

Related U.S. Application Data

(63) Continuation of application No. PCT/JP2006/319555, filed on Sep. 29, 2006.

(30) Foreign Application Priority Data

Sep. 30, 2005 (JP) ................................. 2005-288988
Jun. 2, 2006 (JP) ................................. 2006-155402

(51) Int. Cl.
*B32B 15/02* (2006.01)
*H01B 7/17* (2006.01)

(52) U.S. Cl.
USPC ........ 428/383; 428/375; 428/379; 174/120 R; 174/120 C; 174/120 SR

(58) Field of Classification Search
None
See application file for complete search history.

(56) References Cited

U.S. PATENT DOCUMENTS 5,157,064 A * 10/1992 Gijsman ....................... 524/114
5,326,935 A * 7/1994 Yamaguchi et al. ...... 174/120 R (Continued)

FOREIGN PATENT DOCUMENTS

| | | | |
|---|---|---|---|
| DE | 3315473 | A1 | 10/1984 |
| JP | 63-58709 | A | 3/1988 |
| JP | 3-356112 | U | 5/1991 |
| JP | 6-139828 | A | 5/1994 |
| JP | 6-139829 | A | 5/1994 |
| JP | 6-223634 | A | 8/1994 |
| JP | 7-153320 | A | 6/1995 |
| JP | 7-176215 | A | 7/1995 |
| JP | 7-302513 | A | 11/1995 |
| JP | 10-125140 | A | 5/1998 |
| JP | 10-134642 | A | 5/1998 |
| JP | 10-223052 | A | 8/1998 |
| JP | 11-115066 | A | 4/1999 |
| JP | 11-176245 | A | 7/1999 |
| JP | 2001-194096 | A | 7/2001 |
| JP | 2002-358833 | A | 12/2002 |
| JP | 2003-306599 | A | 10/2003 |
| JP | 2004-193117 | A | 7/2004 |
| TW | 404921 | B | 9/2000 |
| TW | 517502 | B | 1/2003 |
| WO | WO-99/22381 | | 5/1999 |
| WO | WO-01/56041 | A1 | 8/2001 |
| WO | WO-02/099821 | A1 | 12/2002 |

OTHER PUBLICATIONS

Taiwanese Office Action, dated Nov. 18, 2011, for Taiwanese Application No. 095136199, with English translation.

*Primary Examiner* — Jill Gray
(74) *Attorney, Agent, or Firm* — Birch, Stewart, Kolasch & Birch, LLP

(57) ABSTRACT

A multilayer insulated wire, comprising: a conductor; and at least three extruded insulation layers covering the conductor, which extruded insulation layers comprise: (A) an outermost layer composed of an extruded covering layer of a resin whose elongation rate after heat treatment by immersion in a solder at 150° C. for two seconds is at least 290% and at least equal to elongation rate before the heat treatment; (B) an innermost layer comprising a resin whose elongation rate after heat treatment by immersion in a solder at 150° C. for two seconds is at least 290% and at least equal to elongation rate before the heat treatment; and (C) an insulation layer that is placed between the outermost layer and the innermost layer and that is composed of an extruded covering layer of a crystalline resin with a melting point of at least 280° C. or an amorphous resin with a glass transition temperature of at least 200° C.; and a transformer having the multilayer insulated wire.

8 Claims, 1 Drawing Sheet

(56) References Cited

U.S. PATENT DOCUMENTS

| | | | | | |
|---|---|---|---|---|---|
| 5,606,152 | A * | 2/1997 | Higashiura et al. | 174/120 R |
| 5,824,412 | A * | 10/1998 | Hausmann | 428/378 |
| 5,861,578 | A * | 1/1999 | Hake et al. | 174/120 R |
| 5,917,155 | A * | 6/1999 | Hake et al. | 174/120 R |
| 6,056,995 | A * | 5/2000 | Hake et al. | 427/118 |
| 6,291,369 | B1 | 9/2001 | Yoshikawa et al. | |
| 6,296,935 | B1 * | 10/2001 | Higashiura et al. | 428/373 |
| 6,329,055 | B1 * | 12/2001 | Higashiura et al. | 428/383 |
| 6,437,249 | B1 * | 8/2002 | Higashiura et al. | 174/120 R |
| 7,087,843 | B2 * | 8/2006 | Ishii et al. | 174/110 R |
| 7,771,819 | B2 * | 8/2010 | Fukuda et al. | 428/383 |
| 8,008,578 | B2 * | 8/2011 | Saito et al. | 174/110 R |
| 2005/0252679 | A1 * | 11/2005 | Chang et al. | 174/120 R |
| 2008/0187759 | A1 * | 8/2008 | Fukuda et al. | 428/411.1 |
| 2010/0218975 | A1 * | 9/2010 | Mehan | 174/120 SR |
| 2011/0174520 | A1 * | 7/2011 | Fukuda et al. | 174/120 AR |

* cited by examiner

MULTILAYER INSULATED WIRE AND TRANSFORMER USING THE SAME

TECHNICAL FIELD

The present invention relates to a multilayer insulated wire in which insulating layers are composed of three or more extrusion-coating layers. Further, the present invention relates to a transformer in which said multilayer insulated wire is used.

BACKGROUND ART

The structure of a transformer is prescribed by IEC (International Electrotechnical Communication) Standards Pub. 60950 and the like. That is, these standards require that at least three insulating layers are to be formed between primary and secondary windings in a winding, that an enamel film covering a conductor of a winding is not admitted as an insulating layer, and that the thickness of an insulating layer is to be 0.4 mm or more. The standards also provide that a creeping distance between the primary and the secondary windings, which varies depending on the applied voltage, is to be 5 mm or more, and that the transformer withstands a voltage of 3,000 V applied between the primary and the secondary sides for one minute or more, and the like.

According to the standards, conventional transformers have employed such a structure as illustrated in the cross-section view shown in FIG. 2 so far. In the structure of this transformer, an enameled primary winding 4 is wound around a bobbin 2 on a ferrite core 1, in such a manner that insulating barriers 3, to secure the creeping distance, are arranged individually on the opposite sides of the peripheral surface of the bobbin. An insulating tape 5 is wound for at least three turns on the primary winding 4; additional insulating barriers 3, to secure the creeping distance, are arranged on the insulating tape, and an enameled secondary winding 6 is then wound around the insulating tape.

Recently, a transformer having a structure that includes neither the insulating barriers 3 nor the insulating tape layer 5, as shown in FIG. 1, has started to be used in place of the transformer having the structure shown in FIG. 2. The transformer shown in FIG. 1 has an advantage over that shown in FIG. 2, in that it can reduce an overall size and dispense with a winding operation for the insulating tape.

When the transformer shown in FIG. 1 is manufactured, with respect to the primary winding 4 and the secondary winding 6 to be used, at least three insulating layers **4*b* (6*b*), 4*c* (6*c*) and 4*d* (6*d*) must be formed around one or both of conductors 4*a* (6*a***) according to IEC standard.

A winding in which an insulating tape is first wound around a conductor to form a first insulating layer (an innermost layer) thereon, and is further wound to form a second insulating layer (an intermediate layer) and a third insulating layer (an outermost layer) in succession, so as to form three insulating layers that are separable from one another, is known. Further, in place of insulating tapes, it is known that fluororesins are sequentially extruded to cover the outer periphery of a conductor to entirely form three insulating layers (see, for example, JU-A-3-56112 ("JU-A" means unexamined published Japanese utility model application)).

In the above-mentioned case of winding an insulating tape, however, because winding the tape is an unavoidable operation, the efficiency of production is extremely low, and thus the cost of the electrical wire is conspicuously increased.

In the above-mentioned case of extrusion of a fluororesin, since the insulating layer is made of the fluororesin, there is an advantage of good heat resistance and high-frequency characteristic. On the other hand, because of the high cost of the resin and the property, which an external appearance is deteriorated when it is pulled at a high shearing speed, it is difficult to increase the production speed. Consequently, the cost of the electric wire becomes higher like that of the insulating tape does.

To solve such problems, a multilayer insulated wire has been put into practical use, which is obtained by extruding modified polyester resins the crystallization of each of which is controlled and a reduction in molecular weight of each of which is suppressed as the first and the second insulating layers and a polyamide resin as a third insulating layer to cover the outer periphery of a conductor (see, for example, U.S. Pat. No. 5,606,152, JP-A-6-223634 and the like ("JP-A" means unexamined published Japanese patent application)). In association with recent miniaturization of electrical and electric equipment, an influence of heat generation on the equipment has been concerned, so a multilayer insulated wire with improved heat resistance has been proposed, which is obtained by extruding a polyethersulfone resin as an inner layer and a polyamide resin as an outermost layer to cover the outer periphery of a conductor (see, for example, JP-A-10-134642).

After the winding process, the resulting transformer is installed in an instrument (machinery or tools) to form a circuit. In this process, the conductor is exposed at the tip end of the wire drawn out of the transformer and soldered. As electrical and electric instrument has been made more compact, however, there has been a demand for multilayer insulated wires whose coating layers cause no cracking even when part of the covered conductor is drawn out of a transformer, subjected to working such as bending, and then soldered, and in which working such as bending is favorably performed on the covered conductor after soldering.

DISCLOSURE OF INVENTION

In order to solve the problems described above, the present invention contemplates for providing a multilayer insulated wire that meets the demand for improvements in heat resistance and also has good post-soldering workability required for coil applications. Further, the present invention contemplates for providing a reliable transformer with good electrical properties including a coil of such an insulated wire having such heat resistance and good post-soldering workability.

The tasks of the present invention have been achieved with the multilayer insulated wire and the transformer using the same described below.

The present invention provides the multilayer insulated wire and the transformer described below.

(1) A multilayer insulated wire, comprising:

a conductor; and at least three extruded insulation layers covering the conductor, which extruded insulation layers comprise:

(A) an outermost layer composed of an extruded covering layer of a resin whose elongation rate after heat treatment by immersion in a solder at 150° C. for two seconds is at least 290% and at least equal to elongation rate before the heat treatment;

(B) an innermost layer comprising a resin whose elongation rate after heat treatment by immersion in a solder at 150° C. for two seconds is at least 290% and at least equal to elongation rate before the heat treatment; and (C) an insulation layer that is placed between the outermost layer and the innermost layer and that is composed of an extruded covering layer of a crystalline resin with a melting point of at least 280° C. or an amorphous resin with a glass transition temperature of at least 200° C.

(2) The multilayer insulated wire according to (1), wherein a resin to form the outermost layer (A) of the insulation layers is a polyamide resin.

(3) The multilayer insulated wire according to (1), wherein a resin to form the outermost layer (A) of the insulation layers is a fluororesin.

(4) The multilayer insulated wire according to (1), wherein a resin to form the innermost layer (B) of the insulation layers is a resin comprising 100 parts by mass of a thermoplastic linear polyester resin and 5 to 40 parts by mass of an ethylene-based copolymer, wherein the thermoplastic linear polyester resin is partially or entirely formed by combining an aliphatic alcohol component and an acid component, and the ethylene-based copolymer has a carboxylic acid side chain or a metal carboxylate side chain.

(5) The multilayer insulated wire according to (1), wherein a resin to form the innermost layer (B) of the insulation layers is a resin comprising 100 parts by mass of a thermoplastic linear polyester resin and 1 to 20 parts by mass of a resin having at least one functional group selected from the group consisting of an epoxy group, an oxazolyl group, an amino group, and a maleic anhydride residue, wherein the thermoplastic linear polyester resin is partially or entirely formed by combining an aliphatic alcohol component and an acid component.

(6) The multilayer insulated wire according to (1), wherein a resin to form the insulation layer (C) is a polyethersulfone resin.

(7) The multilayer insulated wire according to (1), wherein a resin to form the insulation layer (C) is a polyphenylensulfide resin.

(8) The multilayer insulated wire according to (1), wherein a resin to form the insulation layer (C) is a polyetherimide resin.

(9) The transformer, wherein the multilayer insulated wire according to any one of (1) to (8),is used.

Other and further features and advantages of the invention will appear more fully from the following description, appropriately referring to the accompanying drawing.

BEST MODE FOR CARRYING OUT THE INVENTION

Figure 1:
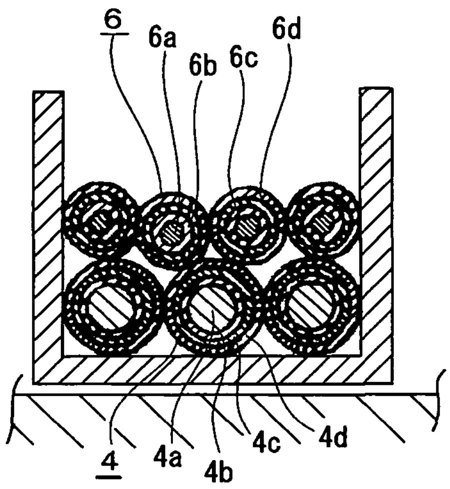
FIG. 1 is a cross-sectional view, illustrating a transformer having a structure in which three-layer insulated wires are used as windings.
Figure 2:
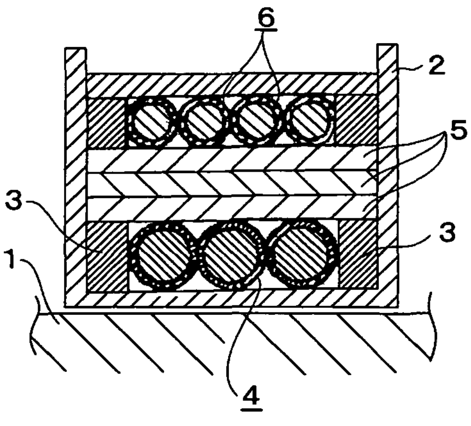
FIG. 2 is a cross-sectional view illustrating a transformer having a conventional structure.

The multilayer insulated wire of the present invention has three or more insulation layers, or preferably three insulating layers. In recent years, as the size of electrical and electronic instrument has decreased, concerns have been raised that heat generation may affect the instrument, so that there has been a demand for multilayer insulated wires having highly improved heat resistance. However, heat-resistant resins have low elongation characteristic and can be easily cracked, as compared with general-purpose resins. In particular, resins can be thermally degraded by thermal history in a soldering process, and such degradation in characteristics can be significant. The insulation layers according to the present invention can have an excellent level of deformability such as bending ability after a soldering process. In the insulation layers according to the present invention, the outermost layer and the innermost layer can also have excellent elongation characteristic after they undergo thermal history. In addition, the innermost layer is excellent in adhesion to the conductor.

To the innermost layer (B), use may be made of a resin excellent in adhesion to the conductor and excellent in elongation characteristic after heating. The resin is preferably one having such post-heating elongation characteristic that its elongation rate after heat treatment by immersion in a solder at 150° C. for two seconds is 290% or more and at least equal to elongation rate before the heat treatment.

In particular, the innermost layer (B) is preferably composed of a resin having such post-heating elongation characteristic that its elongation rate after heat treatment by immersion in a solder at 150° C. for two seconds is from 290% to 450% and at least equal to elongation rate before the heat treatment.

As used herein, the expression "whose elongation rate is at least equal to elongation rate before the heat treatment" means that the difference between the elongation rate of the resin after immersion in a solder at 150° C. for two seconds and the elongation rate before the immersion is in the range of 0% to 50% based on the elongation rate before the immersion.

In addition, the separation of the coating layer part from the conductor is preferably 1.0 mm or less. As used herein, the expression "wire is broken by extension" means that the wire is extended and broken at a pulling rate of 300 m/minute, and the expression "the separation of the coating layer part from the conductor" refers to the length of the coating layer part separated from the end face of the broken wire.

In a preferred embodiment of the present invention, the innermost layer (B) is an extruded coating layer including a mixture of 100 parts by mass of a thermoplastic linear polyester resin and 5 to 40 parts by mass of an ethylene copolymer, wherein the thermoplastic linear polyester resin is partially or entirely formed by combining an aliphatic alcohol component and an acid component, and the ethylene copolymer has a carboxylic acid side chain or a metal carboxylate side chain.

The aliphatic alcohol component may be an aliphatic diol or the like.

The acid component may be an aromatic dicarboxylic acid, an aliphatic dicarboxylic acid, a dicarboxylic acid composed of an aromatic dicarboxylic acid partially substituted with an aliphatic dicarboxylic acid, or the like.

In particular, the thermoplastic linear polyester resin to be used is preferably a product of esterification of an aliphatic diol with an aromatic dicarboxylic acid or a dicarboxylic acid composed of an aromatic dicarboxylic acid partially substituted with an aliphatic dicarboxylic acid. Examples of such a product include polyethylene terephthalate (PET) resins, polybutylene terephthalate (PBT) resins, and polyethylene naphthalate resins.

Examples of aromatic dicarboxylic acids for use in the synthesis of the thermoplastic linear polyester resin include terephthalic acid, isophthalic acid, terephthalic diacid, diphenylsulfonedicarboxylic acid, diphenoxyethanedicarboxylic acid, diphenyl ether carboxylic acid, methyl terephthalate, and methyl isophthalate. In particular, terephthalic acid is preferred.

Examples of dicarboxylic acids composed of aromatic dicarboxylic acids partially substituted with aliphatic dicarboxylic acids include succinic acid, adipic acid, and sebacic acid. The amount of substitution of the aliphatic dicarboxylic acid is preferably less than 30% by mole, particularly preferably less than 20% by mole, based on the amount of the aromatic dicarboxylic acid. Examples of the aliphatic diol for use in the esterification include ethylene glycol, trimethylene glycol, tetramethylene glycol, hexanediol, and decanediol. In particular, ethylene glycol and tetramethylene glycol are preferred. The aliphatic diol may also be partially replaced with oxyglycol such as polyethylene glycol and polytetramethylene glycol.

There are commercially available resins that can be preferably used in the present invention include, as polyethyleneterephthrate (PET)-based resin, Vylopet (trade name, manufactured by Toyobo Co., Ltd.), Bellpet (trade name, manufactured by Kanebo, Ltd.), and Teijin PET (trade name, manufactured by Teijin Ltd.). Teijin PEN(trade name, manufactured by Teijin Ltd.) and Ektar (trade name, manufactured by Toray Industries, Ltd.) are mentioned as commercially available polyethylenenaphtharate-based resin and polycyclohexanedimethyleneterephthrate-based resin respectively.

The resin mixture for forming the innermost layer (B) preferably contains an ethylene copolymer having a carboxylic acid or metal carboxylate side chain linked to the polyethylene. The ethylene copolymer serves to inhibit crystallization of the thermoplastic linear polyester resin.

Examples of the carboxylic acid to be linked include unsaturated monocarboxylic acids such as acrylic acid, methacrylic acid and crotonic acid; and unsaturated dicarboxylic acids such as maleic acid, fumaric acid and phthalic acid. Examples of the metal salt thereof include Zn salts, Na salts, K salts, and Mg salts. Examples of the ethylene copolymer include ethylene-methacrylic acid copolymers with the carboxylic acid group partially replaced with a metal salt group (generally called ionomer resin, such as HIMILAN (trade name) manufactured by Mitsui Polychemical Co., Ltd.), ethylene-acrylic acid copolymers (such as EAA (trade name) manufactured by The Dow Chemical Company), and ethylene graft copolymers having carboxylic acid side chains (such as ADMER (trade name) produced by Mitsui Chemicals, Inc.).

In this embodiment, the resin mixture for forming the innermost layer (B) preferably includes 100 parts by mass of the thermoplastic linear polyester resin and 5 to 40 parts by mass of the ethylene copolymer. If the content of the latter is too low, it can be less effective in inhibiting crystallization of the thermoplastic linear polyester resin so that so-called crazing can often occur in which microcracks are formed in the surface of the insulation layer during a coiling process or any other bending process, although the insulation layer formed has no problem of heat resistance. If the content of the latter is too low, degradation of the insulation layer could also proceed with time to cause a significant reduction in dielectric breakdown voltage. If the content of the latter is too high, the heat resistance of the insulation layer could be significantly degraded. For example, a multilayer insulated wire with a too high ethylene copolymer content may fail to have class B heat resistance, although it has solder heat resistance. The mixing ratio of the former to the latter is preferably 100 parts by mass: 7 to 25 parts by mass.

In another preferred embodiment of the present invention, the innermost layer (B) is an extruded coating layer including a mixture of 100 parts by mass of a thermoplastic linear polyester resin and 1 to 20 parts by mass of a resin having at least one functional group selected from the group consisting of an epoxy group, an oxazolyl group, an amino group, and a maleic anhydride residue, wherein the thermoplastic linear polyester resin is partially or entirely formed by combining an aliphatic alcohol component and an acid component. The thermoplastic linear polyester resin may be the same as in the above embodiment and may also have the same preferred range.

The functional group is reactive with the polyester resin. In particular, such a reactive resin preferably has an epoxy group. The functional group-containing resin preferably includes 1 to 20% by mass of, more preferably 2 to 15% by mass of a monomer unit having the functional group. Such a resin is preferably a copolymer including an epoxy group-containing compound unit. For example, such a reactive epoxy group-containing compound may be an unsaturated carboxylic acid glycidyl ester compound represented by Formula (1):

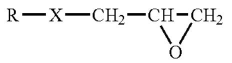

Formula (1)

wherein R represents an alkenyl group having 2 to 18 carbon atoms, and X represents a carbonyloxy group.

Representative examples of the unsaturated carboxylic acid glycidyl ester include glycidyl acrylate, glycidyl methacrylate, itaconic acid glycidyl ester, and the like, preferably it is glycidyl methacrylate.

Typical commercially-available examples of the resin reactive with the polyester resin include Bondfast (trade name, manufactured by Sumitomo Chemical Co., Ltd.) and Lotader (trade name, manufactured by Atofina).

In this embodiment, the resin mixture for forming the innermost layer (B) preferably includes 100 parts by mass of the thermoplastic linear polyester resin and 1 to 20 parts by mass of the functional group-containing resin. If the content of the latter is too low, it can be less effective in inhibiting crystallization of the thermoplastic linear polyester resin so that so-called crazing can often occur in which microcracks are formed in the surface of the insulation layer during a coiling process or any other bending process. If the content of the latter is too low, degradation of the insulation layer can also proceed with time to cause a significant reduction in dielectric breakdown voltage. If the content of the latter is too high, the heat resistance of the insulation layer can be significantly degraded. The mixing ratio of the former to the latter is preferably 100 parts by mass: 2 to 15 parts by mass.

The outermost layer (A) includes a resin having high elongation characteristic after heating. The outermost layer (A) preferably includes a resin having such post-heating elongation characteristic that its elongation rate after heat treatment by immersion in a solder at 150° C. for two seconds is 290% or more and at least equal to elongation rate before the heat treatment.

In particular, the outermost layer (A) preferably includes a resin having such post-heating elongation characteristic that its elongation rate after heat treatment by immersion in a solder at 150° C. for two seconds is from 290% to 450% and at least equal to elongation rate before the heat treatment.

In a preferred embodiment of the present invention, the outermost layer (A) is an extruded coating layer including a fluororesin or a polyamide resin, more preferably including a polyamide resin. Examples of polyamide resins suitable for use in the outermost insulation layer include nylon 6,6 (such as A-125 (trade name) manufactured by Unitika Ltd. and Amilan CM-3001 (trade name) manufactured by Toray Industries, Ltd.), nylon 4,6 (such as F-5000 (trade name) manufactured by Unitika Ltd. and C2000 (trade name) manufactured by Teijin Limited.), nylon 6,T (Arlen AE-420 (trade name) manufactured by Mitsui Chemicals, Inc.), and polyphthalamide (Amodel PXM 04049 (trade name) manufactured by Solvay S. A.).

Examples of fluororesins for use in the outermost layer (A) include ethylene-tetrafluoroethylene copolymer (ETFE) resins and perfluoroalkoxyethylene-tetrafluoroethylene copolymer (PFA) resins. For example, when ETFE resins are used, the extrusion should be performed at a low line speed of at most 20 m/minute. In some cases, corrosion protection is necessary for the extruder, depending on the type of fluororesin. Therefore, the outermost layer (A) is more preferably made of polyamide resin.

The insulation layer (C) between the outermost layer and the innermost layer includes a heat-resistant resin, specifically a crystalline resin having a melting point of 280° C. or more or an amorphous resin having a glass transition temperature of 200° C. or more. The insulation layer (C) preferably includes a crystalline resin having a melting point of 280 to 400° C. or an amorphous resin having a glass transition temperature of 200 to 250° C.

In a preferred embodiment of the present invention, the insulation layer (C) is an extruded coating layer including a polyphenylene sulfide resin (such as DICPPS FZ2200A8 (trade name) with a melting point of 280° C., manufactured by Dainippon Ink And Chemicals Incorporated), a polyetherimide resin (such as Ultem 1010 (trade name) with a glass transition temperature of 217° C., manufactured by GE Plastics Japan Ltd.), or a polyethersulfone resin (such as Sumika Excel PES4100 (trade name) with a glass transition temperature of 225° C., manufactured by Sumitomo Chemical Co., Ltd.). In view of adhesion between the layers, a polyethersulfone resin is more preferred, because it can provide a high level of interlayer adhesion. When two or more insulation layers (C) are provided, the layer including the above resin is preferably in contact with the innermost layer, while it may be any of the two or more layers. For example, the adhesion may be evaluated by a twist peel test that includes the steps of cutting the insulation layers with a utility knife for a length of about 150 mm along the longitudinal direction, then fixing one end of the wire to a twister and inserting the other end into the chuck of the twister to hold the wire straight, and rotating the chuck in this state to twist the wire along the longitudinal direction so that the three insulation layers can be separated from one another. When a polyethersulfone resin is used for the insulation layer (C), the separation strongly tends to occur between the conductor and the innermost layer in this test. When other type of resin is used for the insulation layer (C), the separation strongly tends to occur between the innermost layer and the intermediate layer in this test.

Therefore, the insulation layer (C) most preferably includes a polyethersulfone resin, because it has good adhesion to other layers.

Examples of polyethersulfone resin for use in this invention include the compounds represented in the following formula (2):

Formula (2)

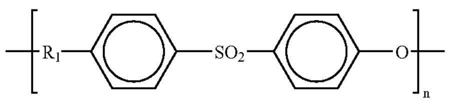

wherein $R_1$ represents a single bond or —$R_2$—O—, in which $R_2$ represents a phenylene group, a biphenylene group, or a group represented by the following formula,

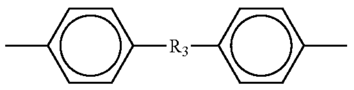

in which $R_3$ represents an alkylene group such as —$C(CH_3)_2$— or —$CH_2$—; and the group represented by $R_2$ may further have a substituent; and n represents a positive integer.

These resins may be produced by usual methods. For example, a manufacturing method in which a dichlorodiphenyl sulfone, bisphenol S, and potassium carbonate are reacted in a high-boiling solvent, can be mentioned. As commercially available resins, for example, VICTREX PES SUMIKAEXCEL PES (trade names, manufactured by Sumitomo Chemical Co., Ltd.), RADELA RADEL R (trade names manufactured by Amoco), and the like can be mentioned.

Polyetherimide resin represented by the following formula (3) is preferably used.

Formula (3)

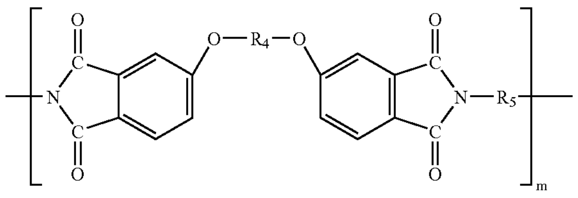

wherein $R_4$ and $R_5$ each represents a phenylene group, a biphenylene group, a group represented by any of the following formulae (A).

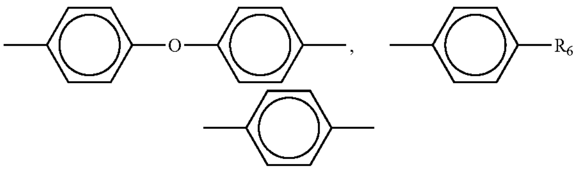

wherein $R_6$ represents an alkylene group preferably having from 1 to 7 carbon atoms (such as preferably methylene, ethylene, and propylene (particularly preferably isopropylidene)), or a naphthylene group, each of which may have a substituent, such as an alkyl group (e.g. methyl and ethyl). m is a positive integer.

As commercially available resins, for example, ULTEM (trade name, manufactured by GE Plastics Ltd.) and the like can be mentioned.

The polyphenylene sulfide resin used in the present invention is preferably a polyphenylene sulfide resin having a low degree of cross-linking because the resin provides a good appearance when used as a coating layer of the multilayer insulated wire. However, unless resin properties are impaired, a cross-linkable polyphenylene sulfide resin may be used in combination, or a cross-linking component, a branching component, or the like may be incorporated into a polymer.

The polyphenylene sulfide resin having a low degree of cross-linking has an initial value of tan δ (loss modulus/storage modulus) of preferably 1.5 or more, or most preferably 2 or more in nitrogen, at 1 rad/s, and at 300° C. There is no particular upper limit on the value of tan δ. The value of tan δ is generally 400 or less, but may be larger than 400. The value of tan δ, in the present invention, may be easily evaluated from time dependence measurement of a loss modulus and a storage modulus in nitrogen, at the above constant frequency, and at the above constant temperature. In particular, the value of tan δ may be calculated from an initial loss modulus and an initial storage modulus immediately after the start of the measurement. A sample having a diameter of 24 mm and a thickness of 1 mm may be used for the measurement. An example of a device capable of performing such measurement includes an Advanced Rheometric Expansion System (trade name, abbreviated as ARES) manufactured by TA Instruments Japan. The above value of tan δ may serve as an indication of a level of cross-linking. A polyphenylene sulfide resin having a too small value of tan δ hardly provides sufficient flexibility and hardly provides a good appearance.

As the insulation layer, other heat resistant thermal plasticity resins, additives generally to be used, inorganic fillers, processing aids, and coloring agents may be added, within the scope they do not impair demanded characteristics.

As the conductor for use in the present invention, a metal bare wire (solid wire), an insulated wire having an enamel film or a thin insulating layer coated on a metal bare wire, a multicore stranded wire (a bunch of wires) comprised of intertwined metal bare wires, or a multicore stranded wire comprised of intertwined insulated-wires that each have an enamel film or a thin insulating layer coated, can be used. The number of the intertwined wires of the multicore stranded wire (a so-called litz wire) can be chosen arbitrarily depending on the desired high-frequency application. Alternatively, when the number of wires of a multicore wire is large, for example, in a 19- or 37-element wire, the multicore wire (elemental wire) may be in a form of a stranded wire or a non-stranded wire. In the non-stranded wire, for example, multiple conductors that each may be a bare wire or an insulated wire to form the elemental wire, may be merely gathered (collected) together to bundle up them in an approximately parallel direction, or the bundle of them may be intertwined in a very large pitch. In each case of these, the cross-section thereof is preferably a circle or an approximate circle.

The multilayer insulated wire of the present invention may be manufactured in a usual manner of sequentially forming insulation layers by extrusion covering, which includes steps of forming a first insulation layer with a desired thickness around a conductor by extrusion covering and then forming a second insulation layer with a desired thickness around the first insulation layer by extrusion covering. An entire thickness of extrusion-insulating layers, i.e. three layers in this embodiment, thus formed is preferably in the range of 60 to 180 μm. If the overall thickness of the insulating layers is too small, the electrical properties of the resulting heat-resistant multilayer insulated wire may be greatly lowered, and the wire may be impractical in some cases. On the other hand, if the overall thickness of the insulating layers is too large, the wire may be impractical in miniaturisation of the equipment, and it may make the working of coil difficult in some cases. More preferably the overall thickness of the extrusion-coating insulating layers is in the range of from 70 to 150 μm. Meanwhile, the thickness of each layer is preferably controlled within the range of from 20 to 60 μm.

The multilayer insulated wire of the present invention has a sufficient level of heat resistance and also has good workability after soldering, which is required for coil applications. Therefore, the multilayer insulated wire of the present invention has a large choice even for post treatment after a winding process. Conventional multilayer insulated wires do not have both at least class B heat resistance and good workability after soldering at a time. The multilayer insulated wire of the present invention satisfies these requirements, because its insulation layers include: the innermost layer comprising a resin having high elongation characteristic after heating and having good adhesion to the conductor, preferably a specific modified polyester resin; the outermost layer comprising a resin having high elongation characteristic after heating, preferably a fluororesin or a polyamide resin, more preferably a polyamide resin; and an insulation layer or layers that are other than the outermost and innermost layers and comprise a heat resistant resin, preferably polyphenylenesulfide, polyethersulfone or polyetherimide. The multilayer insulated wire of the present invention can be directly soldered at the time of the end processing so that winding workability can be sufficiently increased. The transformer of the present invention including the multilayer insulated wire described above has a high level of electrical properties and reliability.

EXAMPLES

The present invention will be described in more detail based on examples given below.

Examples 1 to 7 and Comparative Examples 1 and 2

An annealed copper wire with a diameter of 0.75 mm was used as a conductor. Each multilayer insulated wire was manufactured by sequential extrusion coating on the wire with the extrusion coating resin composition and the thickness of each layer shown in Table 1 (in which the composition data are parts by mass). Several properties of each resulting multilayer insulated wire were examined as described below. Each appearance was also visually observed.

The resin composition for forming each layer of the insulated wire was formed into a 0.2 mm-thick pressed sheet to give an IEC-S type dumbbell-shaped sheet. The dumbbell-shaped sheet was then immersed in a solder at 150° C. for 2 seconds. The elongation rate (%) of the sample was measured at a pulling rate of 50 m/minute according to JIS K 7113 before and after the immersion in the solder. The results are shown in Table 2.

A. Solder Heat Resistance

The solder heat resistance test is a workability test allowing evaluation of bendability after winding and soldering. The multilayer insulated wire prepared by the extrusion coating was immersed in a flux and then placed in a solder at 450° C. for 4 seconds. The wire was then wound around a 0.6 mm bare wire thinner than it. After winding, the surface of the insulated wire was observed. The occurrence of cracking was evaluated as failure, while no change was evaluated as success.

B. Separation Length after Break by Extension The multilayer insulated wire was extended at a pulling rate of 300 mm/minute until the conductor was broken. After the break by the extension, the length of the separation from the end face of the conductor was determined. The case where the separation length was 1.0 mm or less was indicated by the mark "⊚," and the case where the separation length was 100 mm or more was indicated by the mark "x."

C. Electrical Heat Resistance

The electrical heat resistance was evaluated by the following test method, in conformity to Annex U (Insulated wires) of Item 2.9.4.4 and Annex C (Transformers) of Item1.5.3 of 60950-standards of the IEC standards.

Ten turns of the multilayer insulated wire were wound around a mandrel of diameter 8 mm under a load of 118 MPa (12 kg/$mm^2$). They were heated for 1 hour at 225° C. for Class B, and then for additional 399 hours at 200° C. for Class B, and then they were kept in an atmosphere of 25° C. and humidity 95% for 48 hours. Immediately thereafter, a voltage of 3,000 V was applied thereto, for 1 min. When there was no electrical short-circuit, in Class B, it is designated to as "passed". The judgment was made with the tests carried out with n=5. When electrical short-circuit occurred with n=1, it is designated to as "failed".

D. Solvent resistance

A wire subjected to 20-D winding as winding processing was immersed in any of ethanol and isopropyl alcohol solvent for 30 sec. The surface of the sample after drying was observed to judge whether crazing occurred or not.

TABLE 1

| | | | Example 1 | Example 2 | Example 3 | Example 4 | Example 5 | Example 6 | Example 7 | Comparative example 1 | Comparative example 2 |
|---|---|---|---|---|---|---|---|---|---|---|---|
| First layer | Resin (B) | PET | 100 | 100 | 100 | 100 | 100 | 100 | 100 | 100 | — |
| | | Ethylene series copolymer | 15 | 25 | 15 | 15 | — | — | — | 15 | — |
| | | Epoxy group containing resin | — | — | — | — | 15 | 15 | — | — | — |
| | | PES | — | — | — | — | — | — | — | — | 100 |
| | Thickness of the layer [μm] | | 33 | 33 | 33 | 33 | 33 | 33 | 33 | 33 | 33 |
| Second layer | Resin (C) | PES | 100 | 100 | — | 100 | 100 | — | 100 | — | 100 |
| | | PPS | — | — | 100 | — | — | 100 | — | — | — |
| | | Modified PET | — | — | — | — | — | — | — | 100 | — |
| | | Ethylene series copolymer | — | — | — | — | — | — | | 15 | — |
| | Thickness of the layer [μm] | | 33 | 33 | 33 | 33 | 33 | 33 | 33 | 33 | 33 |
| Third layer | Resin (A) | PA66 | 100 | 100 | 100 | — | 100 | 100 | 100 | 100 | 100 |
| | | ETFE | — | — | — | 100 | — | — | — | — | — |
| | Thickness of the layer [μm] | | 33 | 33 | 33 | 33 | 33 | 33 | 33 | 33 | 33 |
| Overall thickness of the layers | | | 100 | 100 | 100 | 100 | 100 | 100 | 100 | 100 | 100 |
| Outer appearance of the wire | | | Good | Good | Good | Some amount of wrinkle | Good | Good | Good | Good | Good |
| Solder heat resistance | | | Passed | Passed | Passed | Passed | Passed | Passed | Passed | Poor Conspicuous melting | Poor Occurrence of cracking |
| Separation length after break by extension [mm] | | | 1.0 mm/◎ | 1.0 mm/◎ | 1.0 mm/◎ | 1.0 mm/◎ | 1.0 mm/◎ | 1.0 mm/◎ | 1.0 mm/◎ | 1.0 mm/◎ | 100 mm/X |
| Electrical heat resistance | Class B | | Passed | Passed | Passed | Passed | Passed | Passed | Passed | Failed | Passed |
| Occurrence of crazing after solvent treatment | Ethanol | | Not occurred | Not occurred | Not occurred | Not occurred | Not occurred | Not occurred | Not occurred | Not occurred | Not occurred |
| | Isopropyl alcohol | | Not occurred | Not occurred | Not occurred | Not occurred | Not occurred | Not occurred | Not occurred | Not occurred | Not occurred |
| Passed or failed in total evaluation | | | ◎ | ◎ | ○ | ○ | ◎ | ○ | ○ | X | X |

TABLE 2

| | | | Resin (B) of Example 1 | Resin (B) of Example 2 | Resin (B) of Example 5 | Resin (B) of Example 7 | Resin (A) of Example 1 | Resin (A) of Example 4 | Resin (B) of Comparative example 2 |
|---|---|---|---|---|---|---|---|---|---|
| First layer | Resin (B) | PET | 100 | 100 | 100 | 100 | — | — | — |
| | | Ethylene series copolymer | 15 | 25 | — | — | — | — | — |

TABLE 2-continued

| | | | Resin (B) of Example 1 | Resin (B) of Example 2 | Resin (B) of Example 5 | Resin (B) of Example 7 | Resin (A) of Example 1 | Resin (A) of Example 4 | Resin (B) of Comparative example 2 |
|---|---|---|---|---|---|---|---|---|---|
| | | Epoxy group containing resin | — | — | 15 | — | — | — | — |
| | | PES | — | — | | — | — | — | 100 |
| Third layer | Resin (A) | PA66 | — | — | — | — | 100 | — | — |
| | | ETFE | — | — | — | — | — | 100 | — |
| Elongation rate of the resin composition (%) | Before heat treatment | | 400 | 405 | 380 | 392 | 292 | 400 | 140 |
| | After heat treatment | | 416 | 420 | 412 | 440 | 296 | 416 | 100 |

In Table 1, "-" indicates no addition of the resin component. With respect to the total evaluation results, the marks "◎," "○" and "x" indicate "more preferable," "preferable" and "unfavorable," respectively.

The abbreviations below are used for the respective resins.

PET: a polyethylene terephthalate resin (Teijin PET (trade name) manufactured by Teijin Limited.)

Ethylene-based Copolymer: an ionomer resin (HIMILAN 1855 (trade name) manufactured by Du-Pont Mitsui Polychemicals Co., Ltd.)

Epoxy group-containing resin (Bondfast 7M (trade name), manufactured by Sumitomo Chemical Co., Ltd.)

PES: a polyethersulfone resin (SUMIKAEXCEL PES 4100 (trade name) manufactured by Sumitomo Chemical Co., Ltd.)

PPS: a polyphenylenesulfide resin (DIC PPS FZ2200A8 (trade name), manufactured by Dainippon Ink and Chemicals, lncorporated),glass transition temperature is 225° C.

Modified PET: a polyethylene terephthalate-elastomer copolymer (C3800 (trade name), manufactured by Teijin Limited.)

ETFE: an ethylene-tetrafluoroethylene copolymer resin (Fluon C-88AXM8 (trade name), manufactured by Asahi Glass Co., Ltd.) PA66: a polyamide 66 resin (FDK-1 (trade name), manufactured by Unitika Ltd.)

The first, second and third layers are formed by coating in this order from the conductor, and the third layer is the outermost layer.

The results shown in Table 1 indicate the following:

Comparative Example 1 shows poor electrical heat resistance, and owing to such low heat resistance, the wire coating significantly melts when immersed in solder. Comparative Example 2 shows a satisfactory level of electrical heat resistance but also shows that a separation length of 100 mm after the break by extension and is cracked during the solder treatment. In contrast, each of Examples 1 to 7 shows a satisfactory level of solder heat resistance, electrical heat resistance, solvent resistance, and wire appearance. In each of Examples 1 to 7, the wire coating resin is not thermally degraded by the thermal history of the solder treatment and has good workability after the solder treatment. Particularly in Examples 1, 2 and 5 each using a combination of PA66 (for the outermost layer) and PES (for the layer other than the outermost and innermost layers), the elongation rate of the resin is at least 290% after the immersion in the solder at 150° C. for 2 seconds, and at least equal to the elongation rate before the heat treatment. As indicated by the fact that the separation of the coating layer portion from the conductor is at most 1.0 mm when the wire is broken by extension, Examples 1, 2 and 5 have the most preferred combination of coatings, because the outermost layer and the innermost layer has a high level of elongation characteristic after the thermal history and because the adhesion between the respective layers is good.

Also in Example 7, the results of the solder heat resistance and the electrical heat resistance are satisfactory.

Industrial Applicability

The multilayer insulated wire of the present invention has a satisfactory level of heat resistance and has good workability after soldering. The multilayer insulated wire of the present invention also has sufficiently high winding workability and thus is useful for a wide range of coil applications.

The multilayer insulated wire of the present invention also has good electrical properties and is suitable for use in transformers of high reliability.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A multilayer insulated wire, comprising:

a conductor; and at least three extruded insulation layers covering the conductor, which extruded insulation layers comprise:

(A) an outermost layer composed of an extruded covering layer of a resin whose elongation rate after heat treatment by immersion in a solder at 150° C. for two seconds is at least 290% and at least equal to elongation rate before the heat treatment;

(B) an innermost layer comprising a resin whose elongation rate after heat treatment by immersion in a solder at 150° C. for two seconds is at least 290% and at least equal to elongation rate before the heat treatment; and (C) an insulation layer that is placed between the outermost layer and the innermost layer and that consists of an extruded covering layer of a crystalline resin with a melting point of at least 280° C. or an amorphous resin with a glass transition temperature of at least 200° C., wherein the resin to form the outermost layer (A) is a fluororesin, wherein the resin to form the innermost layer (B) is a resin comprising a thermoplastic linear polyester resin and an ethylene-based copolymer, or a resin comprising a thermoplastic linear polyester resin and a resin having at least one functional group selected from the group consisting of an epoxy group, an oxazolyl group, an amino group, and a maleic anhydride residue, wherein the thermoplastic linear polyester resin is partially or entirely formed by combining an aliphatic alcohol component and an acid component, and the ethylene-based copolymer has a carboxylic acid side chain or a metal carboxylate side chain, and wherein the crystalline resin to form the insulation layer (C) is a resin selected from the group consisting of a polyethersulfone resin and polyetherimide resin.

2. The multilayer insulated wire according to claim 1, wherein a resin to form the innermost layer (B) of the insulation layers is a resin comprising 100 parts by mass of a thermoplastic linear polyester resin and 5 to 40 parts by mass of an ethylene-based copolymer.

3. The multilayer insulated wire according to claim 1, wherein a resin to form the innermost layer (B) of the insulation layers is a resin comprising 100 parts by mass of a thermoplastic linear polyester resin and 1 to 20 parts by mass of a resin having at least one functional group selected from the group consisting of an epoxy group, an oxazolyl group, an amino group, and a maleic anhydride residue.

4. The multilayer insulated wire according to claim 1, wherein a resin to form the insulation layer (C) is a polyethersulfone resin.

5. The multilayer insulated wire according to claim 1, wherein a resin to form the insulation layer (C) is a polyetherimide resin.

6. A transformer, wherein the multilayer insulated wire according to claim 1 is used.

7. The multilayer insulated wire according to claim 1, wherein the resin to form the innermost layer (B) comprises the thermoplastic linear polyester resin and the resin having at least one functional group wherein an epoxy group is the at least one functional group.

8. A multilayer insulated wire, comprising:

a conductor; and at least three extruded insulation layers covering the conductor, which extruded insulation layers comprises:

(A) an outermost layer composed of an extruded covering layer of a resin whose elongation rate after heat treatment by immersion in a solder at 150° C. for two seconds is at least 290% and at least equal to elongation rate before the heat treatment;

(B) an innermost layer comprising a resin whose elongation rate after heat treatment by immersion in a solder at 150° C. for two seconds is at least 290% and at least equal to elongation rate before the heat treatment; and (C) an insulation layer that is placed between the outermost layer and the innermost layer and that consists of an extruded covering layer of a crystalline resin with a melting point of at least 280° C. or an amorphous resin with a glass transition temperature of at least 200° C., wherein the outermost layer (A) is a fluororesin, wherein the innermost layer (B) is a resin including a mixture of thermoplastic linear polyester and ethylene-based copolymer, and wherein the crystalline resin to form the insulation layer (C) is a resin selected from the group consisting of polyethersulfone resin and polyetherimide resin.

* * * * *

UNITED STATES PATENT AND TRADEMARK OFFICE

CERTIFICATE OF CORRECTION

PATENT NO. : 8,518,535 B2
APPLICATION NO. : 12/078122
DATED : August 27, 2013
INVENTOR(S) : Hideo Fukuda et al.

It is certified that error appears in the above-identified patent and that said Letters Patent is hereby corrected as shown below:

ON THE TITLE PAGE:

At item (73), Assignee, change "The Furukawa Electric., Ltd., Tokyo (JP)" to --The Furukawa Electric Co., Ltd., Tokyo (JP)--.

Signed and Sealed this
Fourth Day of March, 2014

Michelle K. Lee
*Deputy Director of the United States Patent and Trademark Office*